Patented July 30, 1929.

1,722,858

UNITED STATES PATENT OFFICE.

FRED RANSOHOFF, OF NEW YORK, N. Y., ASSIGNOR TO THE FLEISCHMANN COMPANY, A CORPORATION OF OHIO.

METHOD OF YEAST PRODUCTION.

No Drawing. Application filed January 19, 1922. Serial No. 530,444.

Heretofore, in the fermentation industries where solutions containing sugars have been subjected to the action of yeast, either for the production of yeast as a main product or for the production of alcoholic liquids as the main product (with or without recovery of yeast as an additional product), it has been regarded that both carbon dioxide and ethyl alcohol were ultimate products of yeast action and, in the yeast-production industry, it has been considered advisable not only to remove carbon dioxide from the fermentation zone wherein the yeast was grown, in order to produce high yields of yeast, but also to conduct the yeast growth in a liquid nutrient solution in which the alcohol content was as low as possible, the alcohol being regarded as a by-product of yeast growth or metabolism and, as such, not only as being of no nutrient value to the yeast but as actively detrimental when present in any considerable amount in the yeast-nutrient solution.

In the manufacture of bakers' yeast by the usually so-called "aeration" process, one advantage (from the standpoint of yeast growth) hitherto generally regarded as inherent in the blowing of large amounts of air through the solution in which the yeast is growing has been the elimination of alcohol either from the entire body of the yeast-nutrient solution itself or at least from the immediate juxtaposition to the exterior surface of the cells of the yeast, individually considered, suspended in the aerated solution. At best, the alcohol produced in sacchariferous solutions incidental to yeast-growth (as regards the effect of such alcohol upon the yeast cells present) has been regarded as a substance which might be tolerated by the yeast within variable limits but in no event having any directly beneficial effect upon further yeast growth itself.

I am aware of the process proposed by Friedrich Hayduck in German Patent No. 300662, in which reference is made to utilization of alcohol as a nutrient by the yeast, but in the process as referred to in this German patent and in any similar processes which may have been heretofore carried out, the object sought and the feature emphasized as essential was the conduct of the yeast-growing process in such a manner that no appreciable amount of alcohol ever is formed in the ordinary free state in the nutrient solution. On the contrary, this former process has been so regulated that the alcohol components (carbon, hydrogen and oxygen) or some of them are seized upon as nutriment by the yeast cells at the instant of incipient alcohol formation and the alcohol tending to form has been, in its incipiency or nascency, so utilized by the yeast in some manner such as to avoid the actual accumulation of alcohol in the yeast-nutrient solution.

Contrary to the hitherto prevaling belief above referred to, and unlike the process of Hayduck hereinbefore mentioned, my present invention is based upon the discovery that by proper conduct of a yeast-growing process, as hereinafter definitely described in an exemplification of the said invention, a considerable accumulation or addition of alcohol in aqueous solutions in which yeast is growing may be utilized as food material by the yeast with a corresponding increase in the amount of yeast produced, such increase being directly traceable to additional yeast growth induced by the alcohol utilization.

As illustrative of one method of practicing my present invention, given by way of example only and without limiting myself to the details of such example, yeast may be produced as follows:

A "straight grain" mash is prepared from cereal materials which may comprise 35% corn, 40% malt and 25% malt sprouts and this mash is "soured." The "souring" of the mash may be effected in accord with the method described in the United States Patent to Alfred Pollak, No. 1,123,920, by fermentation with lactic acid bacteria and neutralization of lactic acid thus formed in the mash by addition of ammonia or an ammonia derivative of suitable character. A suitable mash is obtained by carrying the souring to such an extent that a total of one liter of an aqueous solution containing 26% of ammonia ($NH_3$) is utilized for every bushel of cereal material from which the mash was originally derived.

The mash, prepared as described or in other suitable and convenient manner, is filtered and diluted with water to the proper extent for use as a yeast-nutrient medium in the aeration process, e. g., the dilution may be such that approximately 100 gallons of nutrient solution, after dilution, are present for each bushel of total cereal materials employed in forming the mash as before described.

Stock yeast for seeding the nutrient solution is added in the usual manner to the extract of the mash, a suitable amount of yeast for this purpose being a quantity by weight equal to about 2.5% the weight of the total nutrient substances present in the solution in which the yeast is grown and, after adding the stock yeast, the solution containing the same is aerated as usual during the period allowed for yeast propagation which may be about 16 hours or longer. A small amount of sulfuric acid may be added to the batch, for example at about the termination of the fourteenth hour of the process, in case this is deemed advisable to compensate for the absence of proper acidity for the completion of the process.

In working with the particular nutrient solution just described, it will ordinarily not be found necessary or useful to add alkaline neutralizing agents during the yeast growth but in working with other nutrients such as those containing large amounts of inorganic ammonium salts and molasses it may be found advantageous to neutralize liberated inorganic acids progressively during the yeast growth by suitable additions of alkaline substances. Molasses and ammonia or ammonium salts may be used as yeast nutrient materials in connection with my improved process, the principal modification made by my process being in the addition to the nutrient solution of a limited quantity of alcohol such that the alcohol added is substantially utilized as a food material by the yeast during a subsequent period of the yeast growth.

At a suitable time during the period of propagation, for example, in a process as above described, at the end of the fourth hour thereof, there is added to the batch about 10% its volume of a 25 proof aqueous solution of alcohol and it has been discovered by me, in the course of experiments, that by such addition the yield of yeast obtained, (as compared with the yield of yeast produced by an absolutely similar process wherein a like quantity of water is added at the same time instead of adding the alcohol solution) is increased by an amount equal to about 6% (of the quantity of yeast obtained without the alcohol addition).

The yeast obtained in increased amount by the addition of alcohol as described is of fully as good a quality for baking purposes as the lower yeast yield obtained without the addition of alcohol, proving that the alcohol present is, in the conduct of my improved process, desirable material in that it is actually utilized as a food material and assimilated for the further increase of the bakers' yeast itself. Instead of adding the alcohol solution after the propagation has progressed for some time as above referred to, it may be added at the beginning of the period of propagation (immediately before or after the introduction of the starting yeast into the nutrient solution) and in such case a similar increase in yeast yield is obtained as in the case of addition of the alcohol at a later stage in the process.

It has been found advisable, ordinarily to limit the quantity of alcohol present at any time in the yeast nutrient solution to a maximum of about 1.5% to 2% alcohol by volume in order to insure the complete utilization of the alcohol as a food material for building up the substance of the yeast.

It has been found desirable to provide an ample quantity of nitrogenous substances, utilizable by the yeast as a source of nitrogent for its growth, in order that the increased yield of compressed yeast obtained by my process will have the usual normal percentage content of nitrogen essential to good baking or raising properties in the yeast. The substances usually employed in yeast production, such for example as the cereal materials used in the production of the mash and nutrient wort hereinbefore described by way of example, will ordinarily contain an ample supply of such nitrogenous substances. As above noted the addition of alcohol as described without any modification of the nitrogenous or other substances present, either as respects the quantities or dilution of these substances results in the obtainment of materially increased yields of yeast.

Having described my invention, what I claim as new and desire to secure by Letters Patent, is:—

1. In the art of manufacturing bakers' yeast, the improvement which comprises propagating yeast with aeration in a yeast nutrient solution, and during the period of propagation adding ethyl alcohol to the propagating liquid in such amounts as may be assimilited by the yeast without either materially inhibiting the rate of propagation or adversely affecting the quality of the yeast, whereby a substantial increase in the yield is obtained over the yield obtainable from an otherwise substantially identical solution without the addition of the ethyl alcohol.

2. In the art of manufacturing bakers' yeast, the improvement which comprises propagating yeast with aeration in a yeast nutrient solution, and during the period of propagation adding ethyl alochol to the propagating liquid in an amount equivalent to about 10% of the volume of the propagating liquid, of 25 proof alcohol, whereby a substantial increase in the yield of yeast is obtained over the yield obtainable from an otherwise substantially identical solution without the addition of the ethyl alcohol, without either substantially increasing the period of propagation or adversely affecting the quality of the yeast.

FRED RANSOHOFF.